United States Patent
Haddad et al.

(10) Patent No.: US 8,655,643 B2
(45) Date of Patent: Feb. 18, 2014

(54) METHOD AND SYSTEM FOR ADAPTIVE TRANSLITERATION

(75) Inventors: Habib Haddad, Boston, MA (US); Imad Jureidini, Cambridge, MA (US)

(73) Assignee: Language Analytics LLC, Cambridge, MA (US)

( * ) Notice: Subject to any disclaimer, the term of this patent is extended or adjusted under 35 U.S.C. 154(b) by 700 days.

(21) Appl. No.: 12/248,422

(22) Filed: Oct. 9, 2008

(65) Prior Publication Data

US 2009/0144049 A1 Jun. 4, 2009

Related U.S. Application Data (60) Provisional application No. 60/978,643, filed on Oct. 9, 2007, provisional application No. 60/978,628, filed on Oct. 9, 2007, provisional application No. 61/030,739, filed on Feb. 22, 2008, provisional application No. 61/059,134, filed on Jun. 5, 2008.

(51) Int. Cl.
*G06F 17/28* (2006.01)

(52) U.S. Cl.
USPC ............ 704/3; 704/9; 704/8; 704/5; 704/277; 704/275; 704/260; 704/2; 715/205; 709/218; 434/157; 370/352

(58) Field of Classification Search
USPC ............... 704/5, 9, 8, 3, 277, 275, 260, 2; 707/999.004; 715/205; 709/218; 434/157; 370/352
See application file for complete search history.

(56) References Cited

U.S. PATENT DOCUMENTS

| | | | |
|---|---|---|---|
| 5,091,950 A * | 2/1992 | Ahmed | 704/277 |
| 5,640,587 A * | 6/1997 | Davis et al. | 715/205 |
| 7,177,794 B2 * | 2/2007 | Mani et al. | 704/8 |
| 7,369,986 B2 * | 5/2008 | Janakiraman et al. | 704/8 |
| 7,376,648 B2 | 5/2008 | Johnson | |
| 7,596,609 B1 * | 9/2009 | Refuah et al. | 709/218 |
| 8,200,475 B2 * | 6/2012 | Kotipalli | 704/3 |
| 2003/0074185 A1 * | 4/2003 | Kang | 704/2 |
| 2003/0097252 A1 * | 5/2003 | Mackie | 704/9 |
| 2003/0200079 A1 * | 10/2003 | Sakai | 704/8 |
| 2005/0216253 A1 * | 9/2005 | Brockett | 704/5 |
| 2006/0031239 A1 * | 2/2006 | Koenig | 707/100 |
| 2006/0080082 A1 * | 4/2006 | Ravindra et al. | 704/8 |
| 2006/0089928 A1 * | 4/2006 | Johnson | 707/4 |
| 2006/0136220 A1 * | 6/2006 | Gurram et al. | 704/275 |
| 2006/0256771 A1 * | 11/2006 | Yarlagadda | 370/352 |
| 2007/0021956 A1 * | 1/2007 | Qu et al. | 704/8 |
| 2007/0255567 A1 * | 11/2007 | Bangalore et al. | 704/260 |
| 2008/0270111 A1 * | 10/2008 | Hanumanthappa | 704/3 |
| 2008/0319735 A1 * | 12/2008 | Kambhatla et al. | 704/9 |
| 2009/0023119 A1 * | 1/2009 | Breidner | 434/157 |

* cited by examiner

*Primary Examiner* — Michael Colucci
(74) *Attorney, Agent, or Firm* — Intrinsic Law Corp; Ibrahim M. Hallaj (57) ABSTRACT

A system and method for transliteration between two different character-based languages is provided. In some embodiments, the system and method provide transliteration from the Arabic language into Roman-based languages such as English. In some embodiments this system and method allows a user to more easily produce Arabic text on English or Roman-based computer hardware and software.

17 Claims, 8 Drawing Sheets

Fig. 7B

METHOD AND SYSTEM FOR ADAPTIVE TRANSLITERATION

I. RELATED APPLICATIONS

This application claims the benefit under 35 U.S.C. §120 to U.S. Provisional Pat. Appl. Ser. No. 60/978,643, entitled "System and Method for Adaptive Transliteration," and to U.S. Provisional Pat. Appl. Ser. No. 60/978,628, entitled "System and Method for Transliteration Input and Output," both to the present inventors and filed on Oct. 9, 2007, and both of which are hereby incorporated by reference. This application is also related to U.S. Provisional Pat. Appl. Ser. No. 61/030,739, entitled "System and Method for Advertising in a Transliteration-Based Text Input System," filed on Feb. 22, 2008, and U.S. Provisional Pat. Appl. Ser. No. 61/059,134, entitled "Smart Search Transliteration Engine and Method," filed on Jun. 5, 2008, both to the present inventors and both of which are also hereby incorporated by reference.

II. TECHNICAL FIELD

The present disclosure relates to systems and methods for transliterating text, and in particular to transliteration between non-Roman character-based languages, such as Arabic, and Roman character-based languages, such as English.

III. BACKGROUND

Now that computer use has become global, it is a technical challenge to provide speakers and readers of various languages with hardware and software adapted for use in their native languages and written character sets. Modern (e.g., personal) computing systems and other electronic, information and communication devices typically include a processor, storage apparatus, and input/output apparatus through which the user of a device interacts to input or enter information into the device, and with which the device displays or outputs information back to the user.

One input apparatus is a keyboard, which generally includes a plurality of keys or buttons corresponding to the letters of an alphabet and other common numerals or characters. In the United States and most other countries, computer systems including an English-based keyboard with the letters of the English alphabet and the decimal numbers and other punctuation characters are available, and many major manufacturers of computing equipment produce products in English or Roman-based character sets only. Furthermore, most computer software and system and application programs are also created today with English speakers primarily or only in mind.

However, for users in locations where the local language is not based on the same Roman character set as English, this requires adaptation of the keyboard, altering the user operation of the keyboard, customizing the system and application software, or all of the foregoing, to allow entry of information into the computer in the local native language. In many areas of the world, native keyboards and system and application software does not exist or is cumbersome to learn and use or is inadequate to provide natural and easy means for input and output of information to the computer in the native format or character set.

One way non-Roman character users have adapted to the use of Roman based computing infrastructures is by way of transliteration. Transliteration is a process used to transcribe text written in a character set into another character set. Transliteration allows users of computers or other electronic devices to express themselves in a language that is difficult to input into Roman-based computing systems for a number of reasons, including for example: the keyboard may not include the characters of the language; even if the keyboard includes the native language's characters, a user may not be familiar with the keyboard layout; and a user may not be fluent in the language, but knows the transliteration of certain names or phrases.

There still exists a need for better systems and techniques for transliteration between languages with different character sets. This includes in the apparatus for transliteration and underlying methods, as well as improvements in all ways of interacting with the transliteration system, including its user interface and architecture and design.

IV. SUMMARY

Transliteration relates to conversion of text or character sets from one set to another, for example, form Arabic to Roman character-based languages such as English, and the reverse process (e.g., Roman to Arabic). Some transliteration systems use a one-to-one mapping from one character set to the other. However, most people are not trained in these rigid transliteration systems, and the systems and processes for using them remain inadequate and difficult to implement and use. Nonetheless ad-hoc transliteration systems are commonly used, relying on loose mappings. These mappings are generally based on phonetic similarities between Arabic and a Roman language the user is familiar with (for example English or French). Where phonetic mappings don't exist (for example in Arabic certain sounds have no equivalents in English, users tend to fall back on one or more commonly understood mappings, which can use alphabetic characters, numbers and/or punctuation (for example, "3" is commonly understood to be a transliteration for the Arabic "ع").

In the absence of an input mechanism for entering a language in its native character set, users sometimes type equivalent or known code characters in the Roman character set to represent the non-Roman characters. This process is referred to herein as "Romanization." Note that the present disclosure is described in the context of an example of transliteration between the Arabic and Roman character-based (e.g., English) languages, but the present concepts can be extended to other schemes and character sets. For example, aspects of the present disclosure can be extended to Arabic-French, Farsi-Spanish, or other transliteration pairs.

Romanization can be performed in a number of ways. Converting Romanized text back into its original character set is difficult because multiple solutions may be available. In some embodiments, the system includes a flexible transliteration system that, when given a Romanized word (non-Roman text written using Roman characters), produces a list of ranked transliteration candidates.

The present disclosure, in a preferred embodiment, provides a system and method for transliterating a Romanized Arabic word or phrase into its Arabic form in the Arabic character set. The present discussion should be understood to be extendable to transliteration between other character set pairs as well. In some embodiments, the system's input includes a Roman character string. In some embodiments, the system's output includes a list of Arabic word candidates ranked according to a score, ranking, or other quantitative metric.

As discussed in greater detail elsewhere in this disclosure, a "score" or quantitative measure of confidence can be assigned to one or more of a list of output candidate words or phrases. The score describes a level of confidence that a given output word is the Arabic word that the user meant to express using the Romanized input.

Different users might use a range of inputs to express the same desired output. The present system can be "fuzzy" because it is able to produce the same best guesses for a variety of reasonable inputs.

In other aspects, the present system and method allow a user to input Arabic text without learning specific transliteration rules, and allow the system to improve its accuracy and efficiency for the same user in future uses as well as for other users if such information is used in more than one session or between sessions of multiple users.

Some embodiments of the present system offer users a choice of Arabic word candidates. The user then selects which output word they wish to use. The system can use statistical information about these selections to refine the scoring system. This produces output rankings more in line with the users' expectations. The system is therefore adaptive.

In one or more embodiments, a user interface is provided which has the following properties: it gives immediate feedback by showing transliteration candidates as the user types; it can display the meaning of the Arabic transliteration candidates; it allows the user to correct mistakes by modifying their transliteration selections at any time; it can automatically provide a best-guess transliteration if the user doesn't actively chose a transliteration; it remembers the user's previous transliteration selections; the transliteration rankings can be customized to a particular user, and; it can provide user selection feedback that can be used to improve the rankings of the transliteration system. Some or all of these features can be implemented in a computing system including a processor, memory, input/output structures, and executing programmed instructions.

One or more embodiments hereof can also be used to input non-Roman text in a number of applications, such as, but not limited to: inputting non-Roman text in a desktop computer application; inputting non-Roman text in a web-based application; and inputting non-Roman text on a mobile device, such as a cell phone.

V. BRIEF DESCRIPTION OF THE DRAWINGS

For a fuller understanding of the nature and advantages of the present invention, reference is be made to the following detailed description of preferred embodiments in connection with the accompanying drawings, in which.

VI. DETAILED DESCRIPTION

The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art upon review of the present disclosure. The claims are therefore intended to cover such modifications.

As mentioned earlier, the present system and method provide for transliteration between two character systems, for example a Roman-based character system and the Arabic language. Some terms used herein are presented below, not by way of limitation or exhaustion, but rather as exemplary of the use of the term, which several of are known to those of skill in the art, and are intended to be taken as such where consistent therewith and where such differing usage is not required by the present illustrative examples.

String: a sequence of characters.

Roman word: a string consisting of a combination of: lower case Roman alphabet characters; upper case Roman alphabet characters; roman numbers; and certain punctuation characters, such as the apostrophe.

Transliteration: The process of converting a Roman string into an Arabic string. Examples include:

"marhaba"→"مرحبا";

"ph"→"ف"; and

"ma3"→"مع".

Harakat: The Arabic language uses diactritic marks called harakat. Other non-Roman languages have similar annotations to differentiate sounds and meanings of similar tokens or strings. The harakat are often omitted from written Arabic, but are spoken. As a result, they play a role in the Romanization of Arabic words. Table I illustrates some common harakat from the example of the Arabic language.

TABLE I

| Harakat | Phonetic equivalent |
|---|---|
| Fatha: | "a" vowel |
| Damma: | "u" vowel |
| Kasra: | "i" vowel |
| Shadda: | Stressed consonant |
| Madda | Glottal stop followed by long "a" |

Token: A data structure comprising one or more of: a Roman string, e.g., "ph"; a transliteration, e.g., an Arabic string which is a plausible transliteration of the Roman string, including harakats; e.g., "ف"; or a positioning flag expressing how the Token's Roman string can be positioned in a Romanized string. For example in the: Start; Middle; End; Alone; Prefix; or Suffix.

A "start" token in some embodiments is followed by a "middle" or "end" token. A "prefix" token is similar, but can also be followed by another "prefix" or "beginning" token. A "prefix" token is typically not part of the stem of the word. A "suffix" token is similar to an "end" token, but it indicates that the token is typically not part of the stem of the word.

It is noted that multiple tokens may exist for a given Roman string, since multiple plausible transliterations are possible, and since the positioning flag may vary for a given Roman string and transliteration pair. For example:

"th" [as in 'three']→"ث";

"th" [as in 'this']→"ذ"; and

"th" [as in 'thus']→"ظ".

In some embodiments, metadata can be associated with a token or with each token, including:

a quality score. Used to distinguish between tokens that are based on same Romanized string. For example: "t"→"ت" has a higher quality score than "t"→"ط"; and "T"→"ط" has a higher quality score than "T"→"ت";

a token length score. Longer tokens tend to more specifically capture the intent of the end user, and are therefore assigned a larger score. For example: "kh"→"خ" scores better than "k"+"h"→"ق"+"ه"; and a popularity score: Comprises a score that expresses how often a particular token is used. The value can be derived from collecting statistics from the user input patterns, or from analyzing Romanized Arabic text, in print or electronic form In addition, embodiments hereof employ some or all of the following elements.

A token database: This comprises a collection of tokens. Token databases are typically optimized for a particular usage scenario. A database can contain tokens optimized for the user's Roman language of choice. In one example, Spanish speakers may use different mappings from Roman to Arabic, compared to English speakers, because of phonetic differences between their two languages. For Spanish, a "j" [kh]→"خ" token makes sense, but not for English.

The token database may also be optimized for differences within Arabic itself (for example Lebanese colloquial versus classical Arabic), or for differences according to a particular user's preferences.

Intermediate transliteration quality database: comprises a database of transliterations and their respective quality scores. These scores can be positive or negative. In some embodiments, the score is derived from the input language rules or Arabic spelling rules. Many alternative scoring techniques can be employed, and the present discussion is meant to comprehend such other variations and possible implementations. Note that in the case of the Arabic spelling rules, database entries may be generated according to a set of rules. For example:

"ph"→"ڤ" has a negative quality score, because the English pronunciation would never match the transliteration;

"ca"→"كا" has a high quality score because its English pronunciation and transliteration are unambiguous; and "u2e"→"ؤ" has a high qualify score because the transliteration follows a common Arabic spelling rule.

Arabic word database: comprises a database of Arabic words, which can optionally include harakats. In some instances the database includes a large (or even all) words of the language. Each word can optionally be assigned a popularity score as described above.

In some, embodiments, the popularity score may be determined by a combination of the following factors, such as: the frequency a word occurs in a set of Arabic publications, in print or electronic form; the frequency the Arabic word is input by the users; dialect variations. For example, Lebanese colloquial may have words with differing popularity scores than classical Arabic; and application contextual information. For example, a popularity database may be compiled that is geared towards technical users. In this case, technical words, uncommon in everyday usage, would be given a higher popularity score than otherwise.

Transliteration popularity database: this database can associate a popularity score with Romanized string/Arabic transliteration pair. The score captures how often a Roman string is input to produce the Arabic output. The transliteration popularity score can be compiled from a number of sources, such as: a statistical analysis of the users' input and selected output transliterations; or a statistical analysis of Romanized Arabic text, derived in paper or electronic form.

An interface between the present system and external components is made possible in some embodiments to receive or otherwise exchange such information between the present system for transliteration and the outside world. In some embodiments, an Internet or similar local or remote networks are coupled to the present transliteration system to send and/or receive information to and/or from the network.

The present system and method can include some portions based on or including a scheme or algorithm, but are not necessarily so restricted, and the present disclosure is not directed strictly to algorithms as such, but may employ algorithms in various forms and embodiments embodied by the totality of the present systems and methods. In some embodiments, hardware executing programmed instructions is implemented as part of the system and to carry out the present method.

Specific embodiments employ the following token database. In addition, the algorithm can optionally use an intermediate transliteration quality database and/or an Arabic word database, which may be generalized to other languages than Arabic of course. In addition, a transliteration popularity database can be employed.

In some embodiments, the input to the algorithm comprises a Romanized Arabic word which the user wants to convert to native Arabic characters. The present system includes a processor that can execute stored instructions on data available to the system or stored thereon. In specific examples, the system includes a computer processor or similar apparatus such as those found on a personal computer (PC) or a handheld device like a personal digital assistant (PDA), smartphone, or other embedded system. The system may include hardware, firmware, and software in any combination. Various parts of the system can be included within one unit, in a box, or provided separately or obtained from different sources.

Figure 1:
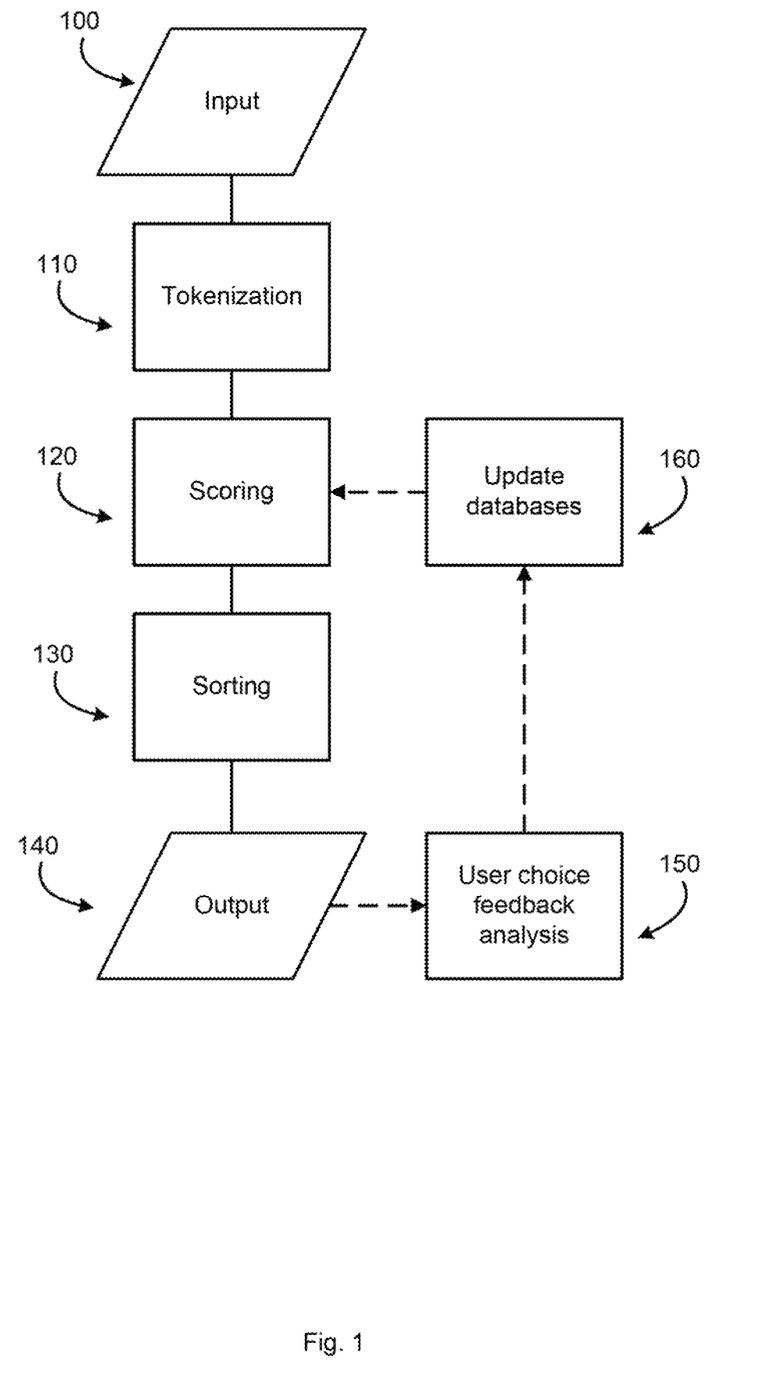
FIG. 1 illustrates an exemplary flowchart of acts in a process for transliteration.

Referring to FIG. 1, a process is disclosed where an input is received at 100 (in a first character set). The input may be received from a human user or a machine (computer, software). The input is tokenized at 110 and the resultant tokens are scored at 120 according to any useful method, including the exemplary ones illustrated above. A sorting is done at 130 to arrange (sort) the possible outputs according to some criteria, including the exemplary ones illustrated above. An output is provided at 140 so that a human user or a machine (computer, software) obtains the sorted output. In one example, the highest scored result is presented first or as a default in a list of possible outputs. The user (again, can be a human user or a machine) provides some feedback at 150 by indicating which output choice was selected. This feedback is used to update a database at 160 so that a database containing information can be more useful in future scoring acts. Also, the feedback can provide other new information to build up the database and expand it.

This feedback feature provides an adaptive aspect to the present system and method. It should be understood that the present schemes can be adapted for use with a number of front-end programming interfaces or user interfaces for inputting and outputting information therefrom.

The present system employs a method that can be programmed into a computing device to accomplish the present transliteration. In some embodiments, an exemplary method includes the following steps, which are not necessarily performed in the order presented for all instances:

(1) Tokenization. The present exemplary method finds the possible tokenizations of the input Roman word. Each tokenization in some instances fulfills the following conditions: the concatenation of the tokens' Roman strings must match the input word; and a token can only be used if it's positioning requirements are met. Again, these steps are presented for an exemplary embodiment or more of the present system and method and are not exhaustive or limiting of other possible examples. Nonetheless, in the exemplary embodiment here, Table II shows one possible tokenization for the input word "khawf":

TABLE II

| Tokens | Token Roman string | Token position flag | Token transliteration |
| --- | --- | --- | --- |
| Token #1 | kh | start | خ |
| Token #2 | a | middle | ـَ |
| Token #3 | w | middle | و |
| Token #4 | f | end | ف |

This tokenization yields the transliteration [khawf] "خوف".

(2) Tokenization scoring: an aggregate score is determined for each tokenization produced. This score is the weighted sum of multiple sub-scores. Sub-scores can be generated at three levels: a) token level b) intermediate level, and c) word level. Each of these is discussed in more detail below for the present exemplary embodiment:

Token level sub-scores are computed by examining the properties of the Tokenization's constituent tokens. A token quality sub-score may be obtained by combining the individual tokens' quality scores; a token length sub-score may be obtained by combining the individual tokens' length scores; and a token popularity sub-score may be obtained by combining the individual tokens' popularity scores. Note that any or all of the foregoing can be used in any combination, depending on the performance and implementation desired.

Intermediate level scoring is computed by examining groups of tokens in the tokenization. Each group corresponds to a Roman substring and an Arabic transliteration substring. The pair's score is obtained from the intermediate transliteration quality database. Sub-scores for all possible subgroups are combined to form an overall intermediate sub-score.

Word level sub-scores are computed by examining the tokenization's transliteration as a whole, ignoring the specific tokenization, with the exception of prefixes. If the tokenization includes one or more prefix tokens, they may be stripped when calculating the word level sub-scores. Similarly, a suffix token may be stripped from the tokenization when computing the word-level subscore.

In word-level scoring, a (positive) dictionary match sub-score may be assigned if the tokenization's transliteration has a strict match in the Arabic word database. When looking for a strict match, prefixes and suffixes can be stripped from the transliteration.

A smaller (positive) sub-score may be assigned if the transliteration has a loose match in the Arabic word database.

Figure 2:
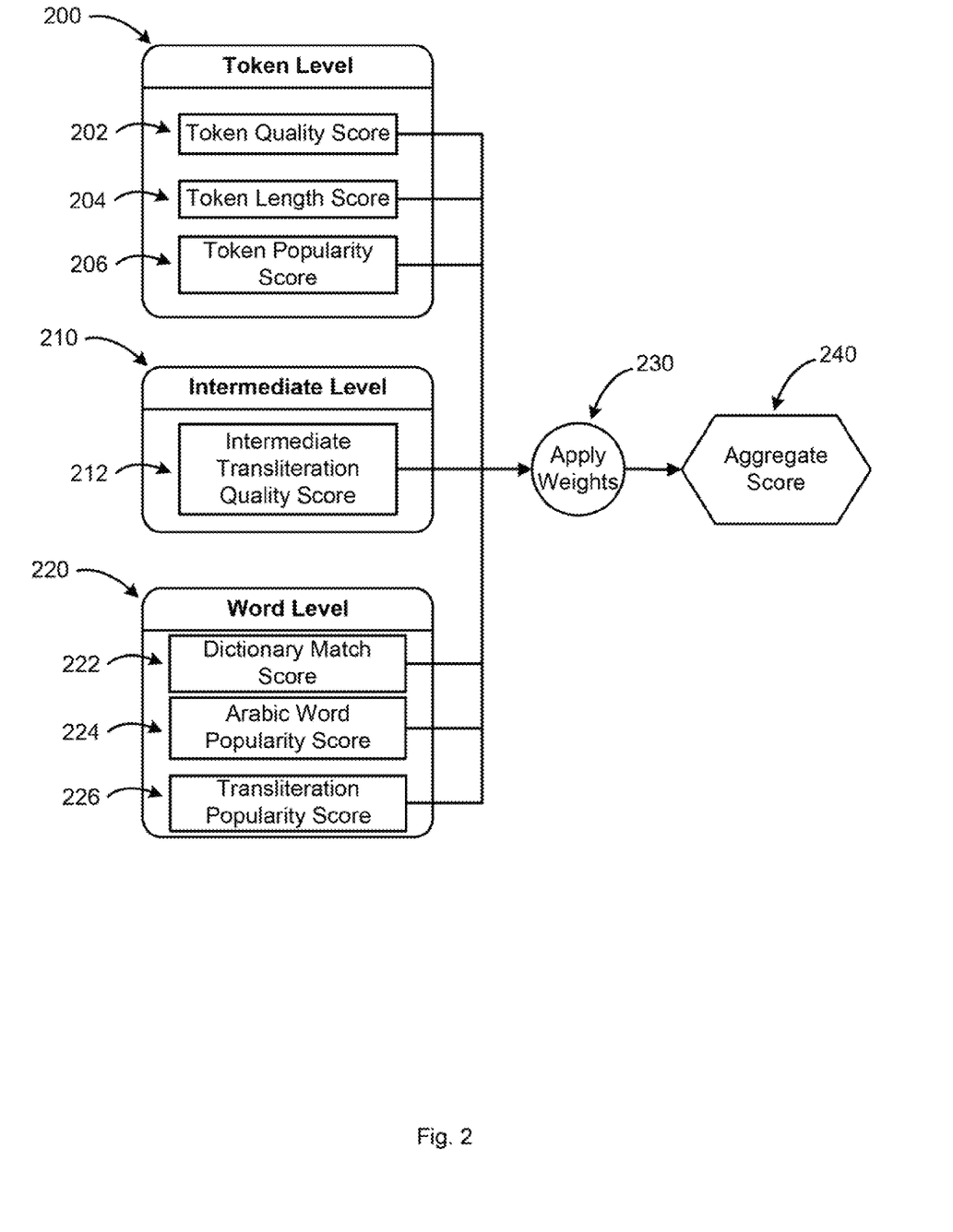
FIG. 2 illustrates an exemplary weighted scoring method.

FIG. 2 illustrates an exemplary outline of a scoring process employing token level scoring 200 that includes token quality score 202, token length score 204, and token popularity (or frequency) score 206. Also, an intermediate level scoring 210 includes scoring an intermediate transliteration quality 212.

A word level scoring 220 includes a dictionary match score 222, an Arabic word popularity (or frequency) score 224, and a transliteration popularity score 226. Weighting of the scores can be applied at any stage that is useful, for example at 230. An aggregate score is obtained after weighting at 240. The weighted score can be used to determine an ordering or sorting of possible matches and outputs to be presented to a user.

In some embodiments, a loose dictionary match can be can be found by removing one or more short vowels (fatha, kasra, damma). For example, if the user enters "kabada" the system will produce (among others) the transliterations [kabada] "كَبَدَ". This transliteration may not be found in the word database with the short vowels. Stripping them gives [k-b-d] "كبد", which may exist in the word database. This is a loose match.

In other embodiments, a loose dictionary match may also be obtained by removing one or more shaddas (stress characters), e.g., [berri] "برّي" may not be in the word database, but [beri] "بري" may be.

In yet other embodiments, a loose dictionary match may further be obtained by removing one or more maddas (extenders), or replacing one or more alef-maddas [CHAR-a1] with alef-hamzas [CHAR-a2], e.g., [aameen] "آمين" may not be in the word database, but [ameen] "أمين" or ['ameen] "أمين" may be.

In still other embodiments, a loose dictionary match may be obtained by replacing one or more alef-hamzas [CHAR-a2] with alefs [CHAR-a], e.g., [akala] "أكل" may not be in the word database, but [akal] "اكل" may be.

According to some exemplary implementations, a score of 0 (zero) may be assigned if no matches for the transliteration can be found in the Arabic word database.

A non-Roman, e.g., Arabic, word popularity sub-score may be obtained from the popularity score of the transliteration in the Arabic word database. The score is higher with higher popularity, although the relation between the popularity and the score need not be linear (it can be logarithmic, have steps, etc.). As in the case of the existence sub-score, the popularity score is higher if the match is strict. This score uses the same strict/loose matching rules as the existence score. For example, when the user enters "ana" the system will produce (among others) the transliterations [ana-1] "أني" and [ana-2] "أنا". However the use of [ana-2] "أنا" is much more frequent then [ana-1] "أني" according to the Arabic word database and is therefore given a higher sub-score.

A transliteration popularity sub-score may be obtained by looking up the Roman input/Arabic transliteration pair in the transliteration popularity database. The sub-score is 0 (zero) if the pair is not found in the database according to some embodiments. For example, "marhaba"→"مرحبا" has a high sub-score, because it is very commonly used, whereas "marhaba"→"مرحبا" has a low sub-score, because it is not commonly used.

The sub-score weights are preferably chosen to optimize or maximize the System's ability to produce a best-guess transliteration from a pre-defined database of frequently used Romanized Arabic words and their transliterations. Again, similar notions can be applied for other non-Roman alphabets and vocabularies.

(3) Tokenization sorting. The list of tokenizations is sorted according to each tokenization's aggregate score.

(4) Output. A new list is generated from the sorted tokenization list. This list contains the transliteration of each tokenization, as well as its associated score. Typically the transliteration is stripped of its harakats, since they are not typically used in written Arabic. However the transliteration can be provided with harakats, or with different combinations of harakats. If multiple harakat combinations are output, they can be ranked by order of popularity in the Arabic word database. The output is provided to the user in the form of a choice of transliterations.

(5) User selection analysis. The user of the present system makes a selection of which candidate transliteration he or she wants to use. These steps can be carried out by a human, a machine in a system, or a combination of the two. A statistical analysis of the user's selections can be used to refine data Examples of the data that can be refined in this process include: the token popularity scores in the token database, reflecting e.g., how popular is the "th" [as in 'this']→ "ذ" token versus the "th" [as in 'thus']→ "ظ" token; the Arabic word popularity scores in the Arabic word database, reflecting e.g., how popular is the use of the word [keefik] "كيفك"; the transliteration popularity score in the transliteration database, reflecting e.g., how popular is it to input "allah" to mean "الله".

If the Arabic word database does not include harakat information, the user selections can be used to infer the proper harakat form of a word. For example, if users frequently use "kabada"→ "قَبَضَ", one can infer that the word [kabada] قبض is written [k-b-d] "قَبَضَ" with harakats. The Arabic word database can subsequently be updated to include this information. Additionally, frequently occurring input/output selection pairs can be added to the transliteration database used for optimizing the weights used in the scoring process.

Figure 3:
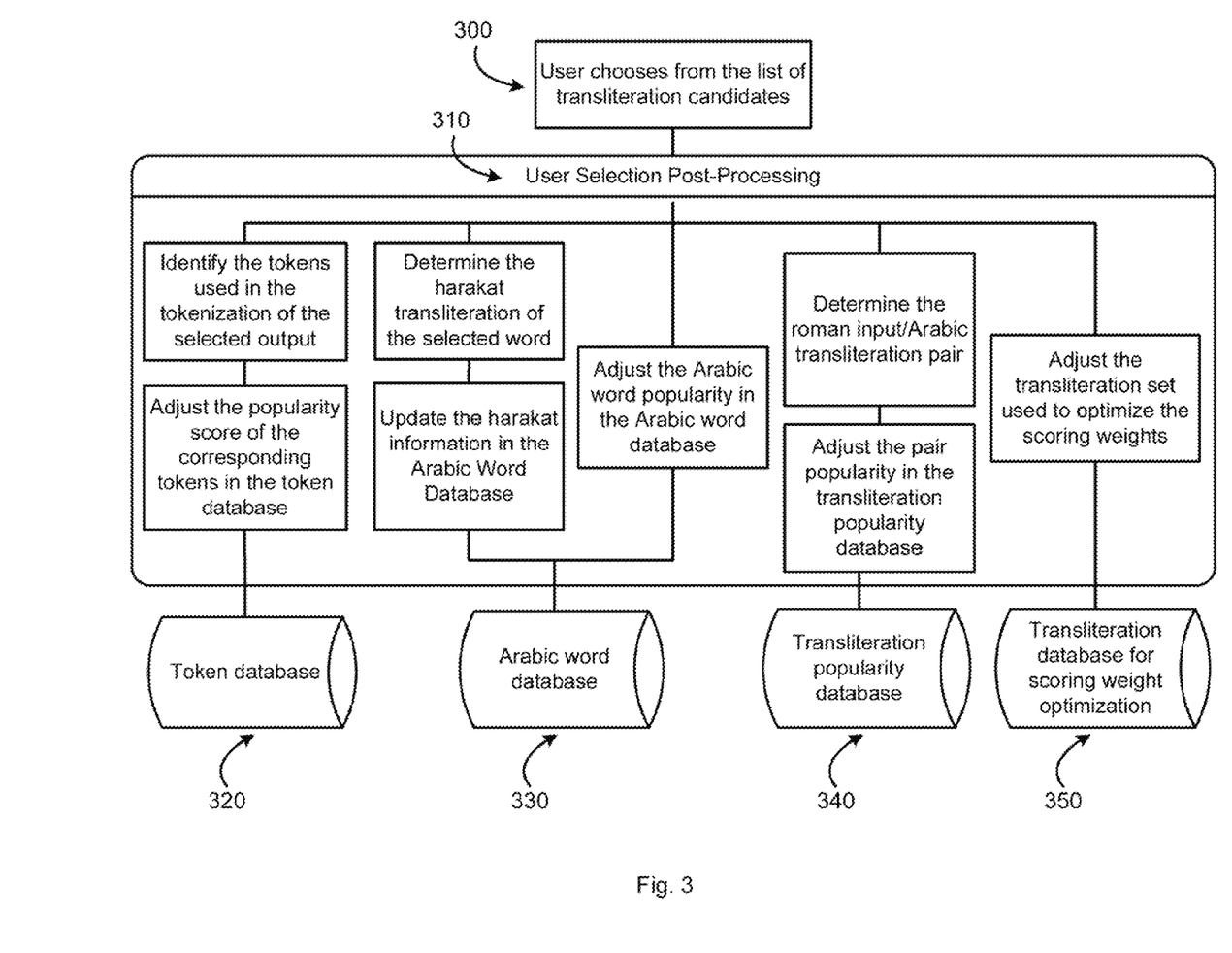
FIG. 3 illustrates an exemplary selection post-processing method.

FIG. 3 illustrates an exemplary process for the post-processing of user selections in the present system and method. At 300, the user (man or machine) selects a selection from a list of presented transliteration candidates output to the user. The user selection is post-processed at 310 in any of several ways that result in enhancements to the system, database, algorithms, and future performance thereof. For example, the post-processing 310 can result in additions, modifications, deletions, or improvements to a token database 320, an Arabic word database 330, a transliteration popularity (or frequency) database 340, and a transliteration database for scoring weight optimization 350.

As mentioned earlier, the present system and method provide for transliteration between two character systems, for example a Roman-based character system and the Arabic language. In one or more exemplary embodiments, an input method can be used in any user interface element that allows textual input and selection. For example, this can be an HTML INPUT element or an HTML TEXTAREA element. We will refer to the input user interface element as a textbox, but other user interface elements can be employed as well.

In some aspects, the present system and method provides a transliteration system that, given a Romanized word, produces a list of ranked transliteration candidates. In some embodiments this includes translations of selected words or phrases. The transliteration system can optionally provide the meaning of each transliteration candidate. Some embodiments of the system use a transliteration cache to locally store the transliteration candidates that are returned from the transliteration system for quick access.

Figure 4:
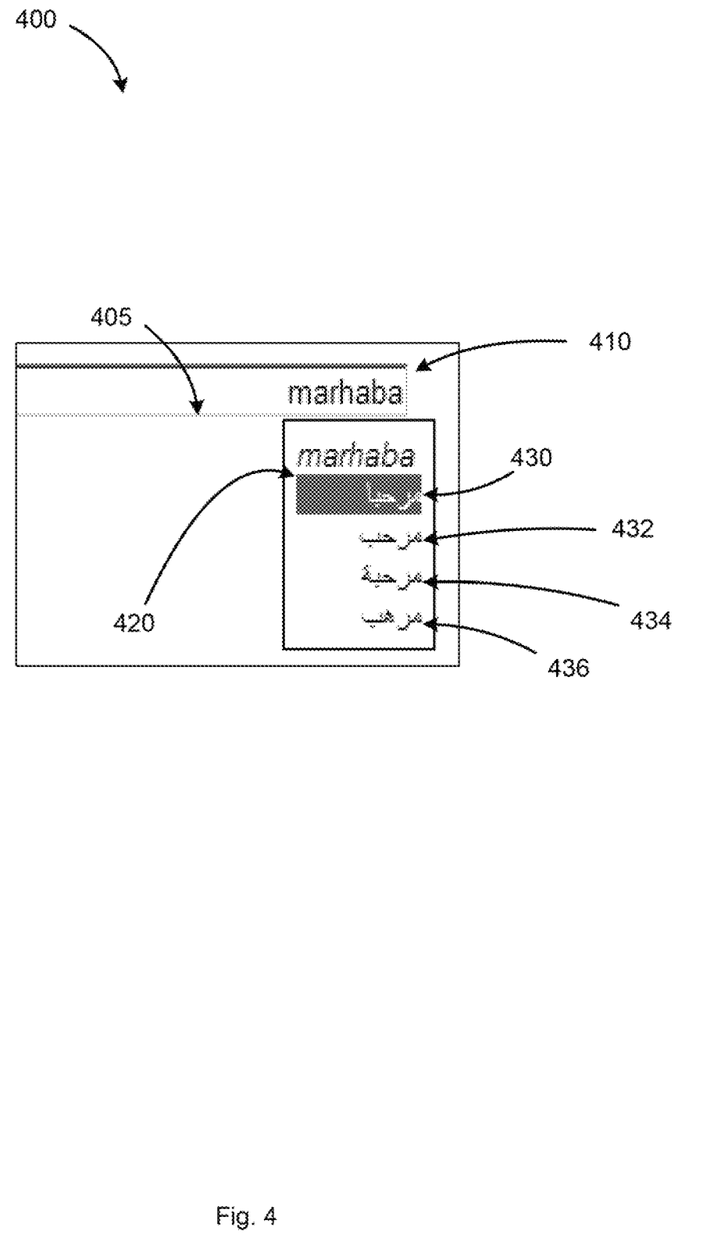
FIG. 4 illustrates an exemplary selected Roman word and the candidate transliterations returned by the transliteration system.

FIG. 4 illustrates an exemplary user interface 400 for presenting transliteration candidate outputs to a user. An output window 405, which can be displayed on a computer or handheld device display monitor, holds visible information to convey the outputs to the user. Note that audible alternatives can be used instead of or in conjunction with the presently described visual output interface 400 to accommodate those with disabilities or other needs.

An input "marhaba" is shown at 410. The interface includes a highlighting element, such as a text highlighter 420 to show the presently-selected option 430. Other options 432, 434, and 436 are available and shown, but not presently selected. The user can select the other options 432, 434, or 436 by using an input interface (e.g., touch screen, scroll wheel, mouse, keyboard, voice input, etc.) to move the highlighting 420 to the user's desired selection. Note that the output options can be sorted as described herein by ordering them for example.

Figure 5:
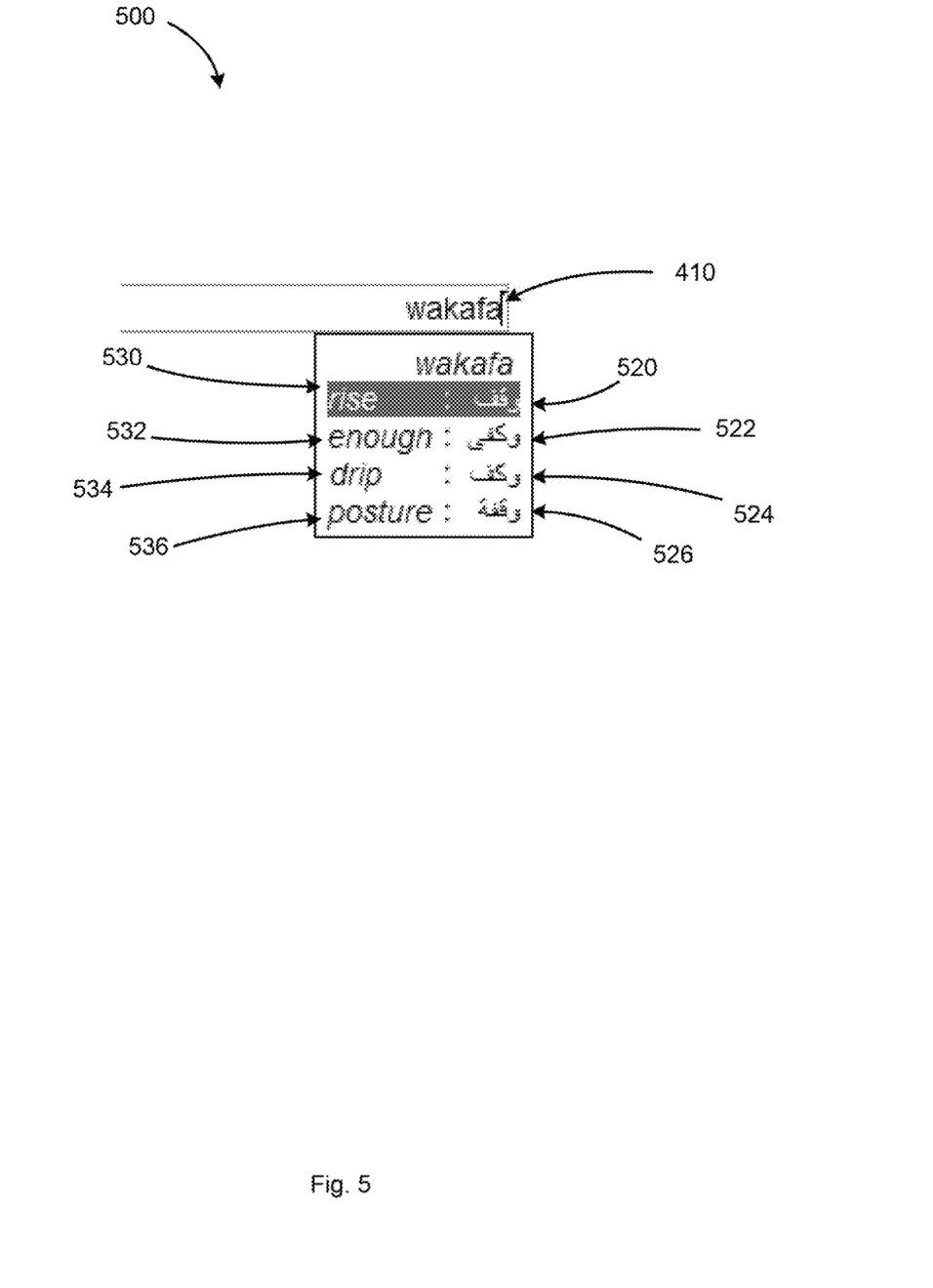
FIG. 5 illustrates an exemplary selected Roman word and the candidate transliterations returned by the transliteration system, including word meanings.

FIG. 5 illustrates an exemplary user interface 500 that provides a translation feature. For a given input 510, the system provides a list of sorted possible outputs. In this case, each possible output is given in its Arabic form (520-526) and also along with its corresponding English translation (530-536) respectively.

Figure 6:
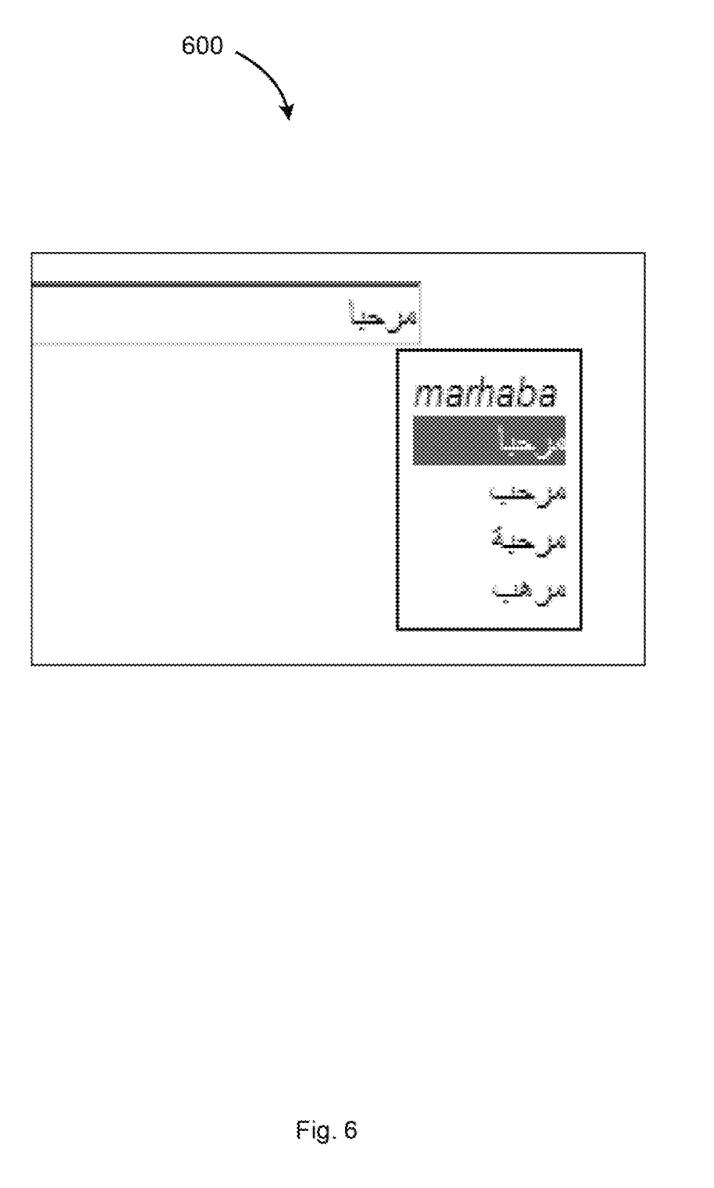
FIG. 6 illustrates an exemplary selected Arabic word and the candidate transliterations obtained from the transliteration cache.

FIG. 6 illustrates another exemplary user interface 600 that provides a root input word in a first character set and associates it with a group of outputs beneath a corresponding word in a second character set. The outputs are obtained from a cache as described above.

Figure 7A:
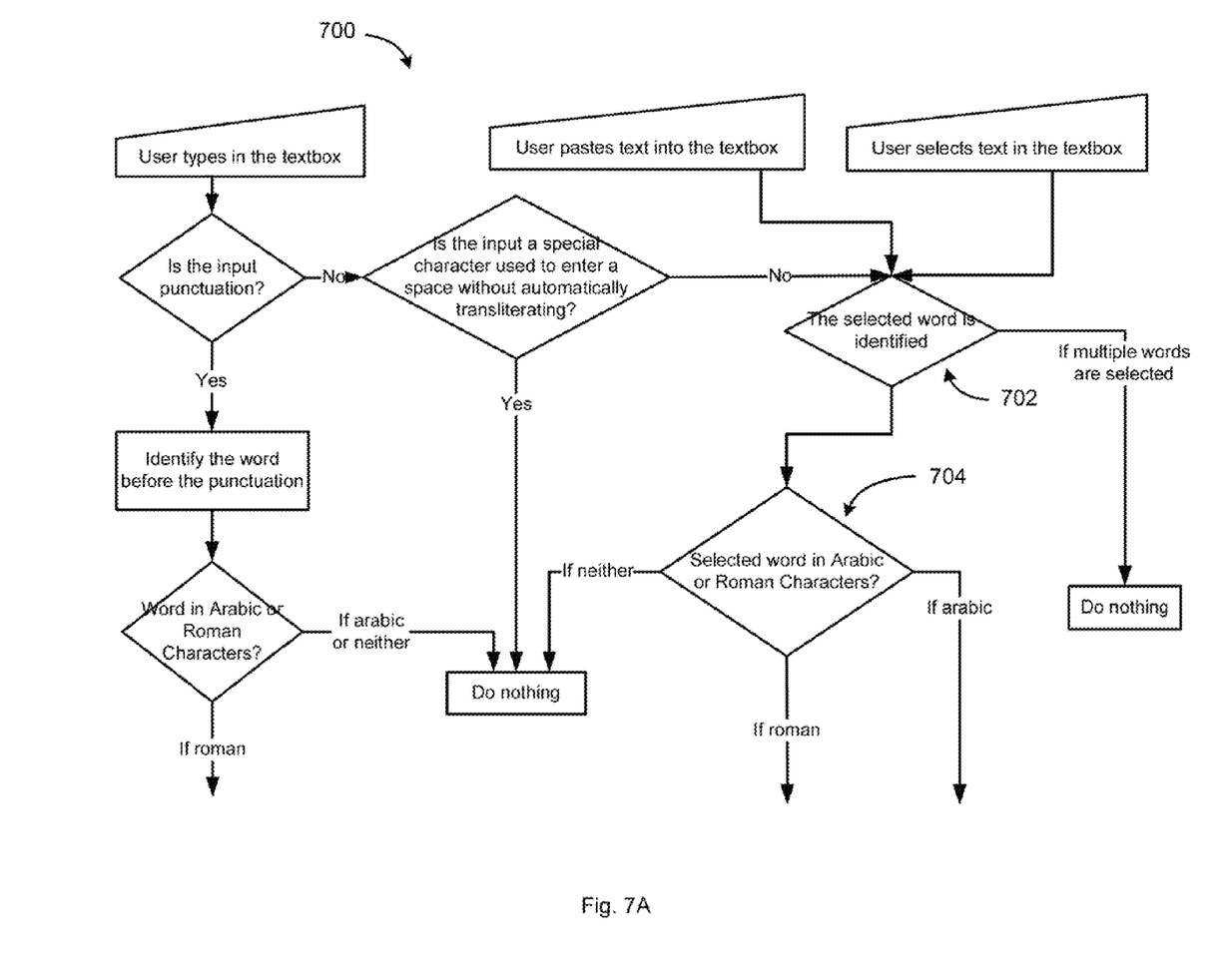
FIG. 7 illustrates an exemplary sequence of acts from a method implemented in a system for transliteration input and output.
Figure 7B:
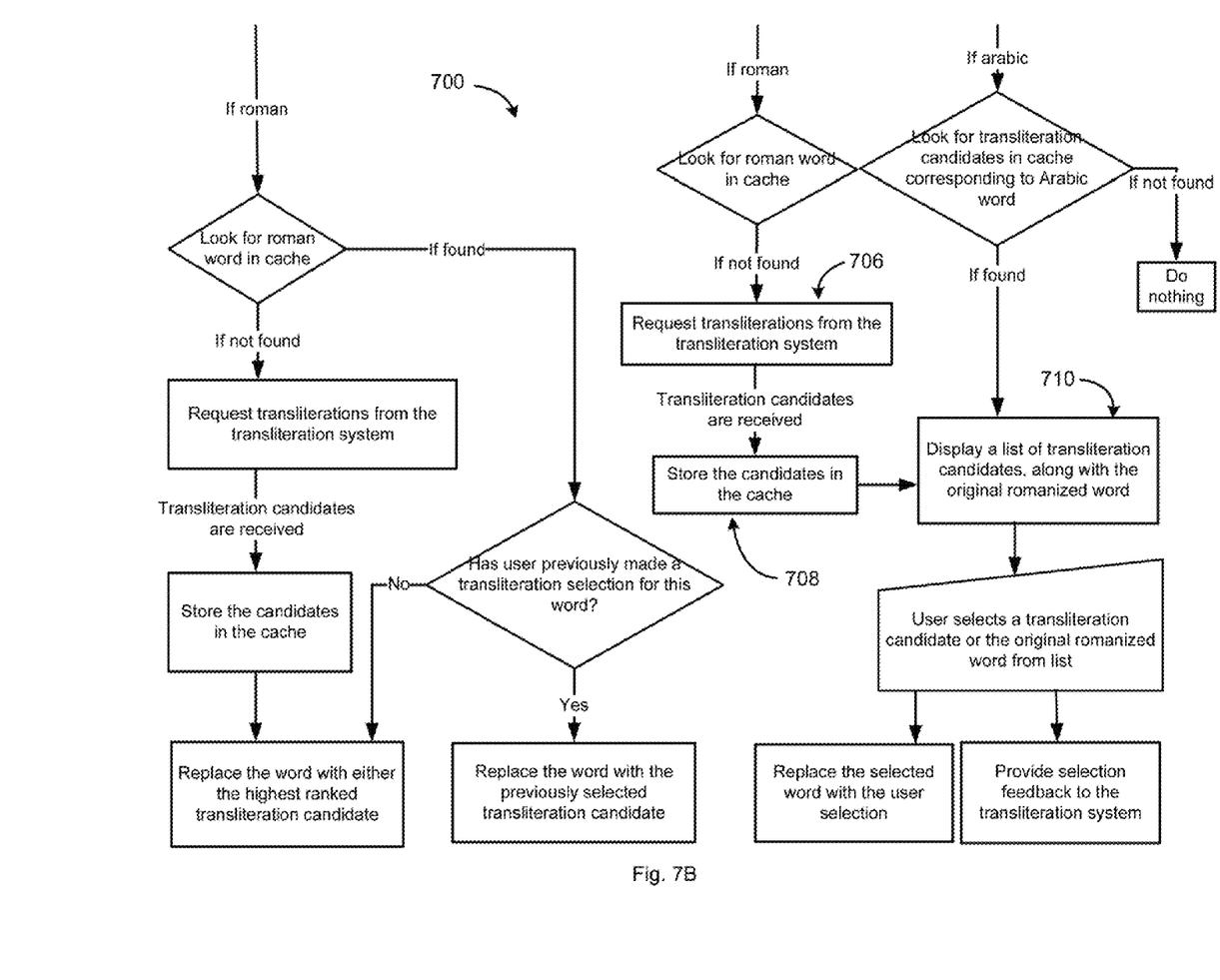

Now referring to FIG. 7, an exemplary system's logic flow is described below. It should be appreciated that this presents an exemplary and illustrative embodiment of the steps in a method, not intended to be limiting or exhaustive of other embodiments, where additional steps can be performed, or some of the indicated steps removed as appropriate.

At 700, the user enters, or selects text in the textbox. This can include typing with the keyboard into the textbox, copying and pasting text into the textbox, or selecting existing text in the textbox, of other ways of entering information into a place adapted to receive user input.

At 702, the selected word is identified. When typing, the currently typed word is considered to be selected. If multiple words are selected, the system does nothing further; if a single word is selected, the system proceeds.

At 704, the system determines whether the selected word is comprised of exclusively Arabic characters, exclusively Roman characters, or neither of those two cases. If the selected word is neither, the system does nothing further; if the selected word is purely Roman, proceed to step 4; if the selected word is purely Arabic, the system proceeds as indicated; if the selected word is purely Roman, it is looked up in the Transliteration Cache. If transliteration candidates are found in the cache, the system proceeds as indicated.

At 706, the system requests the transliteration candidates from the transliteration system. Once the transliteration candidates are received, they are stored in the transliteration cache at 708, along with their meanings if available. If the selected word is Arabic, the system looks it up in the transliteration cache; if it is not found in the cache, the system does nothing further. Output messages and signals may be delivered from the system to another component or module or to a user (e.g., through a readable display) to indicate the progress at each step of the process. If the selected word is found, the system retrieves the transliteration candidates from the cache.

At 710, the system displays a user interface element listing the Romanized word and transliteration candidates. Each entry is selectable by the user. If available, the Arabic word's meaning can be displayed next to it.

When the user makes a selection the original word is replaced by the new selection; the selection is stored, either locally or remotely. This will allow the selection to be remembered if the same word is input at a later time.

Feedback can be provided to the transliteration system regarding the user selection. This feedback can help improve the accuracy of the transliteration system.

In some embodiments, the user may input special characters or key combinations into the textbox. One of these can be used to prevent the automatic transliteration of the preceding word. For example, if a user were to input CTRL-SPACE, the system could input a space character without automatically transliterating the preceding word.

The system can also provide the user with a method to disable transliterations altogether. This can be in the form of a user interface element, such as a button, and/or a special character or key combination input into the textbox. A method can also be provided to re-enable the transliteration functionality.

Textboxes in software applications can have a text direction setting. The text direction is either left-to-right or right-to-left. An application can either impose a text direction on a user, or it may provide a mechanism to switch the text direction, such as a button. When a textbox has a left-to-right text direction, one may infer that either the application developer or the user intends to use the textbox for text written mostly in a left-to-right language, and vice-versa. The system can therefore detect the text-direction of the textbox, and automatically enable or disable the automatic transliteration features of the user interface.

In some specific embodiments, if the textbox direction is left-to-right, the system can infer than the user intends to input mostly roman text. It can therefore disable the automatic transliteration which would normally take place when punctuation is input. In other specific embodiments, if the textbox direction is right-to-left, the system can infer than the user intends to input mostly Arabic text, and can enable the automatic transliteration.

One or more embodiments of the present system and method can further accomplish ranking of transliteration options. The transliteration system can take into account one or more of the following factors when determining the transliteration candidates and their ranking, for example, in one or more embodiments:

The user's native language. This can be determined by the user actively choosing what language he or she prefers; the user's locale can be determined by examining the "Accept-Language" header in an HTTP request made by the user's browser; and/or the browser language setting, obtained for example using javascript.

The transliteration language, including, dialect variations. This can be based on the user's previous selections and/or the selections of a population of users. For example:
users from the same geographic location, users using the same input language; and/or users of a certain age group, or sharing other demographic attributes.

In addition, the present system and method can provide communication functions. The transliteration system can run either locally or remotely. A remote transliteration system can be hosted on one or more servers. The request and response can be encoded in many different forms.

In some embodiments, the transliteration system can be hosted on a web server. A hyper text transfer protocol (HTTP) request can ask the web server for transliterations of a given word. This word, and other relevant information, such as a user id, language, or other preferences, can be encoded in the uniform resource locator (URL), a cookie, HTTP POST header or body, SOAP transaction, XML document, etc. The list of transliteration candidates can be returned in the HTTP response's body, encoded in any number of formats, such as plain text, JSON, XML, SOAP, etc.

Some embodiments hereof include the use of a textbox to accomplish a data input function. The textbox can be any user interface element that receives text as input. For example: an HTML or XHTML input element; an HTML or XHTML text area element; or a textbox or rich textbox control; and a custom text input element that allows text input and selection, such as a word processor or email editor.

It can be seen that the present system and method can be applied to provide input and/or output to/from a transliterator. It should be also seen that the actual and precise nature of the transliterator or transliteration system associated with the present input and output system is not limiting of the present input and output system. That is, a number of transliteration engines, programs, machines, and algorithms are potentially suited for use herewith.

We claim:

1. A computer-based method for adaptive transliteration between a first and a second character set, comprising:
   receiving a set of input tokens in a first character set, entered into an input element of a user interface;
   transliterating, in a processor, a subset of said set of input tokens substantially in real-time as said input tokens are received in said input portion of a user interface by comparing said subset of the input tokens against a database of known tokens in a second character set;
   determining a set of output tokens in said second character set; and
   providing a machine-readable output representative of said output tokens substantially in real-time responsive to receiving said input and upon processing and determining said output tokens.

2. The method of claim 1, said input tokens comprising a plurality of characters from said first character set.

3. The method of claim 1, said output tokens comprising a plurality of characters from said second character set.

4. The method of claim 1, said comparing step comprising comparing the input tokens with a corresponding group of possible entries in a database associating said input and said output tokens.

5. The method of claim 1, said input element comprising a text box adapted for receiving said input tokens.

6. The method of claim 1, said providing an output comprising providing an output to an output element of said user interface.

7. The method of claim 6, further comprising accepting a user selection from a plurality of possible options available to said user from said output.

8. The method of claim 7, further comprising processing said user selection and providing a result of said processing to affect future transliteration operations.

9. A system for adaptive transliteration between a first character set and a second character set, comprising:
   a user interface input element for sequentially receiving input token entries in a first character set;
   a processor for transliterating a subset of said input tokens substantially in real-time as they are received in said input element; and
   an output element of said user interface for providing an output comprising at least one output token in said second character set, corresponding to said input tokens, substantially in real-time as the corresponding input tokens are received.

10. The system of claim 9, further comprising a database, coupled to said processor, for storing tokens in said first and second characters sets.

11. The system of claim 9, said input element comprising a text box for receiving said input tokens from a user.

12. The system of claim 9, said output element comprising an area for display of said output tokens to a user.

13. The system of claim 9, further comprising a transliteration score engine that receives a pair of associated tokens and provides an output indicative of a quantitative measure of the correlation between said pair of associated tokens.

14. The system of claim 9, further comprising a transliteration popularity database that receives a possible transliteration input and provides an output dependent on a metric indicative of the popularity of said possible transliteration.

15. A computer-based method for transliterating information, comprising:
- sequentially receiving a set of input characters in a first character set in an input element of a user interface;
- converting said input set of characters in said first character set into a set of input tokens in said first character set;
- determining, in a processor, a plurality of transliteration matches to said input tokens from a possible set of output tokens in a second character set;
- scoring, in said processor, said at least one match to determine a best match between said input tokens and said output tokens; and
- presenting said output tokens to a user in an output element of said user interface, substantially in real time, based on said scoring such that a best suggested output token is preferentially presented along with other possible matches; and
- analyzing a user selection of one of a plurality of presented output tokens.

16. The method of claim 15, said preferentially presenting of said best suggested output token further comprising sorting said output tokens so that said best suggested output token takes a primary place in said sorting.

17. The method of claim 15, further comprising storing a result of said user selection in a database for improving future transliteration operation.

* * * * *